(12) United States Patent
Tomoda

(10) Patent No.: US 11,947,643 B2
(45) Date of Patent: Apr. 2, 2024

(54) FRAUD DETECTION SYSTEM, FRAUD DETECTION METHOD, AND PROGRAM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 364 days.

(21) Appl. No.: 17/415,708

(22) PCT Filed: Dec. 26, 2019

(86) PCT No.: PCT/JP2019/051258
§ 371 (c)(1),
(2) Date: Jun. 17, 2021

(87) PCT Pub. No.: WO2021/130991
PCT Pub. Date: Jul. 1, 2021

(65) Prior Publication Data
US 2022/0327186 A1    Oct. 13, 2022

(51) Int. Cl.
*G06F 21/31*    (2013.01)
*G06F 16/35*    (2019.01)
*G06Q 20/40*    (2012.01)

(52) U.S. Cl.
CPC ........ *G06F 21/316* (2013.01); *G06F 16/355* (2019.01); *G06Q 20/4016* (2013.01)

(58) Field of Classification Search
CPC ............ G06F 16/355; G06F 16/24575; G06F 21/316; G06F 21/552; G06F 21/554; G06N 3/08; G06Q 20/4016; G06Q 20/4014; G06Q 30/0248; G06Q 30/0225; G06Q 10/0635;
(Continued)

(56) References Cited

U.S. PATENT DOCUMENTS 6,330,546 B1 * 12/2001 Gopinathan .......... H04M 15/47
                                                                                                                   705/38
7,788,195 B1 * 8/2010 Subramanian ......... G06N 20/00
                                                                                                                    706/20
(Continued)

FOREIGN PATENT DOCUMENTS

CN      109871488 A      6/2019
CN      109978538 A    *   7/2019
(Continued)

OTHER PUBLICATIONS

Y. Li, Y. Sun and N. Contractor, "Graph mining assisted semi-supervised learning for fraudulent cash-out detection," 2017 IEEE/ACM International Conference on Advances in Social Networks Analysis and Mining (ASONAM), Sydney, NSW, Australia, 2017, pp. 546-553. (Year: 2017).*
(Continued)

*Primary Examiner* — Michael Simitoski
(74) *Attorney, Agent, or Firm* — HEA LAW PLLC

(57) ABSTRACT

A fraud detection system including at least one processor configured to: calculate a fraud level of a user who uses a service based on a behavior of the user; obtain a determination result as to whether the behavior is actually fraudulent; and calculate accuracy of fraud detection for each user based on the fraud level and the determination result.

12 Claims, 10 Drawing Sheets

DB3

| USER ID | ACCURACY | CORRECTION AMOUNT |
|---------|----------|-------------------|
| u00001  | 94.25%   | 0                 |
| u00002  | 4.33%    | 46                |
| u00003  | 74.63%   | 1.5               |
| .       | .        | .                 |
| .       | .        | .                 |
| .       | .        | .                 |

(58) Field of Classification Search
CPC ... H04L 63/102; H04L 63/1416; H04W 12/12
See application file for complete search history.

(56) References Cited

U.S. PATENT DOCUMENTS

| | | | | |
|---|---|---|---|---|
| 8,682,293 | B1* | 3/2014 | Zang | H04M 15/47 |
| | | | | 455/410 |
| 9,047,608 | B1* | 6/2015 | Einav | G06Q 30/018 |
| 9,875,355 | B1 | 1/2018 | Williams | |
| 10,754,936 | B1* | 8/2020 | Hawes | G06F 21/316 |
| 10,902,428 | B1* | 1/2021 | Amram | G06Q 20/4016 |
| 10,949,434 | B1* | 3/2021 | Tirupattur Saravanan | |
| | | | | G06Q 50/01 |
| 10,997,596 | B1* | 5/2021 | Thomas | G06Q 20/4016 |
| 11,270,311 | B1* | 3/2022 | Jass | G06Q 20/388 |
| 2002/0194119 | A1* | 12/2002 | Wright | G06Q 20/10 |
| | | | | 705/38 |
| 2009/0018940 | A1* | 1/2009 | Wang | G06Q 40/00 |
| | | | | 705/35 |
| 2009/0297037 | A1* | 12/2009 | Pele | G06V 10/422 |
| | | | | 382/209 |
| 2011/0264612 | A1* | 10/2011 | Ryman-Tubb | G06Q 20/4016 |
| | | | | 706/12 |
| 2012/0101930 | A1* | 4/2012 | Li | G06Q 40/02 |
| | | | | 705/35 |
| 2012/0272305 | A1* | 10/2012 | Buckwalter | G06Q 10/10 |
| | | | | 726/6 |
| 2013/0132178 | A1* | 5/2013 | Masuko | G06Q 30/0217 |
| | | | | 705/14.19 |
| 2014/0304158 | A1* | 10/2014 | Basu | G06Q 20/4016 |
| | | | | 705/44 |
| 2015/0026061 | A1* | 1/2015 | Siegel | G06Q 20/4016 |
| | | | | 705/44 |
| 2015/0370801 | A1* | 12/2015 | Shah | G06Q 30/0282 |
| | | | | 707/728 |
| 2016/0048831 | A1* | 2/2016 | Ongchin | G06Q 20/3276 |
| | | | | 705/44 |
| 2016/0210631 | A1* | 7/2016 | Ramasubramanian | |
| | | | | G06Q 20/4016 |
| 2016/0335551 | A1* | 11/2016 | Droll | G06Q 20/4016 |
| 2017/0262852 | A1* | 9/2017 | Florimond | G06N 3/08 |
| 2018/0033009 | A1* | 2/2018 | Goldman | G06Q 40/10 |
| 2018/0182029 | A1* | 6/2018 | Vinay | G06Q 40/03 |
| 2018/0225450 | A1* | 8/2018 | Byrne | G06F 21/554 |
| 2018/0247312 | A1* | 8/2018 | Loganathan | G06Q 20/4014 |
| 2018/0253755 | A1* | 9/2018 | Cheng | G06F 15/76 |
| 2018/0349889 | A1* | 12/2018 | Ghosh | G06Q 20/3674 |
| 2018/0365593 | A1* | 12/2018 | Galitsky | G06N 5/022 |
| 2019/0095608 | A1* | 3/2019 | Kohli | G06Q 20/405 |
| 2019/0114404 | A1* | 4/2019 | Nowak | H04W 12/06 |
| 2019/0220863 | A1* | 7/2019 | Novick | G06Q 20/10 |
| 2019/0236609 | A1* | 8/2019 | Li | G06N 3/08 |
| 2019/0258904 | A1* | 8/2019 | Ma | G06F 18/24133 |
| 2019/0325879 | A1 | 10/2019 | Mossoba et al. | |
| 2019/0377819 | A1* | 12/2019 | Filliben | G06N 3/084 |
| 2020/0034853 | A1* | 1/2020 | Lim | G06Q 20/4016 |
| 2020/0053111 | A1* | 2/2020 | Jakobsson | H04L 63/1416 |
| 2020/0067861 | A1* | 2/2020 | Leddy | G06F 21/6245 |
| 2020/0089887 | A1* | 3/2020 | Luthra | G06F 21/577 |
| 2020/0126085 | A1* | 4/2020 | Roche | G06Q 20/102 |
| 2020/0175421 | A1* | 6/2020 | Zhou | G06F 18/2451 |
| 2020/0175757 | A1* | 6/2020 | Li | G06T 15/00 |
| 2021/0029137 | A1* | 1/2021 | Wright | H04L 63/08 |
| 2021/0049418 | A1* | 2/2021 | Zhao | G06N 3/047 |
| 2021/0117977 | A1* | 4/2021 | Kim | G06F 18/214 |
| 2021/0128084 | A1* | 5/2021 | Dai | G06T 7/0012 |
| 2021/0192522 | A1* | 6/2021 | Jameson | G06Q 40/12 |
| 2021/0194883 | A1* | 6/2021 | Badhwar | H04L 63/107 |
| 2021/0218761 | A1* | 7/2021 | Cheng | G06F 21/57 |
| 2021/0374753 | A1* | 12/2021 | Kramme | G06Q 30/0185 |
| 2022/0180369 | A1* | 6/2022 | Okuda | G06N 20/00 |

FOREIGN PATENT DOCUMENTS

| | | | | |
|---|---|---|---|---|
| JP | 6514813 B1 | 5/2019 | | |
| WO | 2016114793 A1 | 7/2016 | | |
| WO | WO-2016114793 A1 * | 7/2016 | | G06F 21/316 |

OTHER PUBLICATIONS

A. Roy, J. Sun, R. Mahoney, L. Alonzi, S. Adams and P. Beling, "Deep learning detecting fraud in credit card transactions," 2018 Systems and Information Engineering Design Symposium (SIEDS), Charlottesville, VA, USA, 2018, pp. 129-134, doi: 10.1109/ SIEDS. 2018.8374722. (Year: 2018).*

P. Shenvi, N. Samant, S. Kumar and V. Kulkarni, "Credit Card Fraud Detection using Deep Learning," 2019 IEEE 5th International Conference for Convergence in Technology (I2CT), Bombay, India, 2019, pp. 1-5, doi: 10.1109/I2CT45611.2019.9033906. (Year: 2019).*

Office Action dated Sep. 23, 2021, for corresponding TW Patent Application No. 109136115 with partial English translation pp. 1-15.

Search Report dated Nov. 15, 2021, for corresponding EP Patent Application No. 19955402.3 pp. 1-7.

* cited by examiner

| USER ID | USER NAME | AUTHENTICATION INFORMATION | CENTER OF USE | AVERAGE ACCESS TIME | AVERAGE ACCESS FREQUENCY |
|---|---|---|---|---|---|
| u00001 | A | abc111 | MINATO-KU···, TOKYO | 10:00–11:00 | 1.5 TIMES |
| u00002 | B | 123nnn999 | SETAGAYA-KU···, TOKYO | 20:00–21:00 | 1.2 TIMES |
| u00003 | C | ppp1212 | YOKOHAMA-SHI···, KANAGAWA | 15:00–16:00 | 5.4 TIMES |
| ⋮ | ⋮ | ⋮ | ⋮ | ⋮ | ⋮ |

FIG.5

| BEHAVIOR HISTORY ID | USER ID | IP ADDRESS | URL | ACCESS LOCATION | ACCESS DATE AND TIME | FRAUD LEVEL | DETERMINATION RESULT |
|---|---|---|---|---|---|---|---|
| t00001 | u00001 | 192.168.39.32 | URL1 | MINATO-KU···, TOKYO | 2019/1/2 10:42:56 | 0.30% | NORMALITY DETERMINED |
| t00002 | u00055 | 192.174.25.56 | URL2 | YOKOHAMA-SHI···, KANAGAWA | 2019/1/2 10:47:20 | 99.99% | FRAUD DETERMINED |
| ⋮ | ⋮ | ⋮ | ⋮ | ⋮ | ⋮ | ⋮ | ⋮ |
| t20001 | u00001 | 192.168.42.126 | URL3 | MINATO-KU···, TOKYO | 2019/9/3 20:11:35 | 0.20% | ⋮ |
| t20002 | u00125 | 192.175.116.25 | URL4 | KITAKYUSHU-SHI···, FUKUOKA | 2019/9/3 20:18:01 | 0.52% | ⋮ |
| ⋮ | ⋮ | ⋮ | ⋮ | ⋮ | ⋮ | ⋮ | ⋮ |

| USER ID | ACCURACY | DB3 CORRECTION AMOUNT |
|---|---|---|
| u00001 | 94.25% | 0 |
| u00002 | 4.33% | 46 |
| u00003 | 74.63% | 1.5 |
| ⋮ | ⋮ | ⋮ |

| 2019/1/2 | 2019/2/15 | 2019/3/3 | ... | 2019/6/20 | 2019/7/2 | 2019/8/20 |
|---|---|---|---|---|---|---|
| 0.30% | 90.00% | 0.25% | ... | 0.42% | 0.01% | 0.09% |
| NORMALITY DETERMINED | FRAUD DETERMINED | NORMALITY DETERMINED | ... | NORMALITY DETERMINED | NORMALITY DETERMINED | NORMALITY DETERMINED |

| 2019/1/2 | 2019/2/15 | | |
|---|---|---|---|
| | 2019/1/2 | 2019/2/15 | 2019/3/3 |
| | 0.30% | 90.00% | 0.25% |
| | NORMALITY DETERMINED | FRAUD DETERMINED | NORMALITY DETERMINED |

∗
∗
∗

| 2019/1/2 | 2019/2/15 | 2019/3/3 | ... | 2019/6/20 |
|---|---|---|---|---|
| 0.30% | 90.00% | 0.25% | ... | 0.42% |
| NORMALITY DETERMINED | FRAUD DETERMINED | NORMALITY DETERMINED | ... | NORMALITY DETERMINED |

∗
∗
∗

FRAUD DETECTION SYSTEM, FRAUD DETECTION METHOD, AND PROGRAM

CROSS REFERENCE TO RELATED APPLICATIONS

This application is a National Stage of International Application No. PCT/JP2019/051258 filed on Dec. 26, 2019. The contents of the above document is incorporated herein by reference in its entirety.

TECHNICAL FIELD

The one or more embodiments of the present invention relates to a fraud detection system, a fraud detection method, and a program.

BACKGROUND ART

There are known techniques for analyzing a behavior of a user who uses a service and detecting fraud of the user. For example, Patent Literature 1 describes a system that continuously acquires information on a behavior history such as a bedtime or wakeup time of a user, and calculates the user's fraud (credit score) based on the acquired information on the behavior history and parameters such as the user's lifestyle, character, and preference.

CITATION LIST

Patent Literature

Patent Literature 1: JP6514813B

SUMMARY OF INVENTION

Technical Problem

However, there are limitations in the accuracy of calculation of a fraud level. For example, even if a user's fraud level is high, the user may not actually be fraudulent. In contrast, even if a user's fraud level is low, the user may actually be fraudulent. Patent Literature 1 does not describe any difference between the fraud level calculated by the system and the determination result as to whether the user is actually fraudulent, and the accuracy of the fraud detection for each user cannot be calculated.

One or more embodiments of the present invention have been conceived in view of the above, and an object thereof is to provide a fraud detection system, a fraud detection method, and a program capable of calculating accuracy of fraud detection for each user.

Solution to Problem

In order to solve the above described issues, a fraud detection system according to one aspect of the present invention includes fraud level calculating means for calculating a fraud level of a user who uses a service based on a behavior of the user, determination result obtaining means for obtaining a determination result as to whether the behavior is actually fraudulent, and accuracy calculating means for calculating accuracy of fraud detection for each user based on the fraud level and the determination result.

A fraud detection method according to one aspect of the present invention includes a fraud level calculating step of calculating a fraud level of a user who uses a service based on a behavior of the user, a determination result obtaining step of obtaining a determination result as to whether the behavior is actually fraudulent, and an accuracy calculating step of calculating accuracy of fraud detection for each user based on the fraud level and the determination result.

A program according to one aspect of the present invention causes a computer to function as fraud level calculating means for calculating a fraud level of a user who uses a service based on a behavior of the user, determination result obtaining means for obtaining a determination result as to whether the behavior is actually fraudulent, and accuracy calculating means for calculating accuracy of fraud detection for each user based on the fraud level and the determination result.

According to one aspect of the present invention, the fraud level calculating means calculates a fraud level of each behavior based on each of a plurality of behaviors, the determination result obtaining means obtains a determination result as to whether each behavior is actually fraudulent, and the accuracy calculating means calculates the accuracy based on a fraud level and a determination result of each behavior.

According to one aspect of the present invention, the fraud level calculating means calculates the fraud level of a behavior for which whether it is fraudulent has not been determined based on a learning model that has learned a behavior for which whether it is fraudulent has been determined as indicated by the determination result obtained by the determination result obtaining means.

According to one aspect of the present invention, the accuracy calculating means calculates a value of a predetermined loss function based on the fraud level and the determination result, and obtains the calculated value as the accuracy.

According to one aspect of the present invention, a coefficient of the loss function is determined such that a false negative has a greater impact on the accuracy.

According to one aspect of the present invention, the fraud level calculating means calculates the fraud level on an assumption that a behavior of another user for which whether it is fraudulent has been determined is performed by the user, the determination result obtaining means obtains the determination result of the behavior of the another user, and the accuracy is calculated based on the fraud level of the behavior that is assumed to be performed by the user and the determination result of the behavior of the another user.

According to one aspect of the present invention, the fraud level calculating means determines a weighting coefficient in calculating the fraud level based on the fraud level according to a behavior that is previously performed and a determination result as to whether the behavior is actually fraudulent, and calculates the fraud level based on the determined weighting coefficient.

According to one aspect of the present invention, the fraud level calculating means calculates the fraud level further based on at least one of an authentication method of the user and a nominee of the user.

According to one aspect of the present invention, fraud detection system further includes executing means for executing processing according to the accuracy.

According to one aspect of the present invention, the processing is processing for changing a value of the fraud level calculated by the fraud level calculating unit.

According to one aspect of the present invention, the processing is processing for providing the user with a coupon relating to the service.

Effects of the Invention

According to the present invention, accuracy of fraud detection for each user can be calculated.

BRIEF DESCRIPTION OF THE DRAWINGS

FIG. 4 is a diagram illustrating an example of data storage of a user database;

FIG. 5 is a diagram illustrating an example of data storage of a behavior history database;

FIG. 6 is a diagram illustrating an example of data storage of an accuracy database;

DESCRIPTION OF EMBODIMENTS

[1. Overall Configuration of Fraud Detection System]

Figure 1:
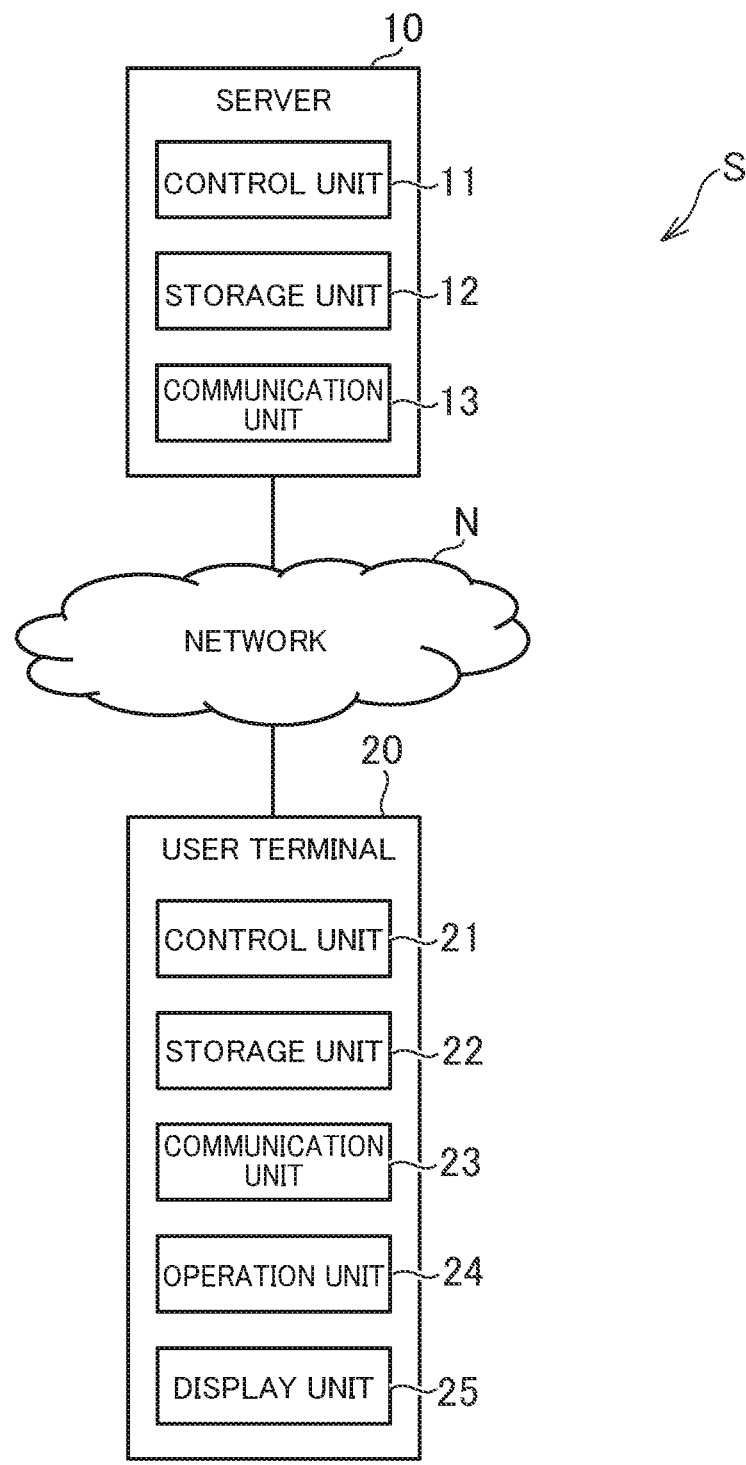
FIG. 1 is a diagram illustrating an overall configuration of a fraud detection system.

An embodiment of a fraud detection system according to one aspect of the present invention will be described below. FIG. 1 is a diagram illustrating an overall configuration of the fraud detection system. As shown in FIG. 1, the fraud detection system S includes a server 10 and a user terminal 20, which are connectable to a network N, such as the Internet. FIG. 1 shows one server 10 and one user terminal 20, although the number of them may be two or more.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main storage unit and an auxiliary storage unit. For example, the main storage unit is a volatile memory such as RAM, and the auxiliary storage unit is a nonvolatile memory such as ROM, EEPROM, flash memory, and hard disk. The communication unit 13 is a communication interface for wired or wireless communication and performs data communication over the network N.

The user terminal 20 is a computer operated by a user. For example, the user terminal 20 is a mobile phone (including a smart phone), a portable information terminal (including a tablet computer), and a personal computer, for example. In this embodiment, the user terminal 20 includes a control unit 21, a storage unit 22, a communication unit 23, an operation unit 24, and a display unit 25. The physical configurations of the control unit 21, the storage unit 22, and the communication unit 23 may be respectively the same as those of the control unit 11, the storage unit 12, and the communication unit 13.

The operation unit 24 is an input device, and is, for example, a pointing device such as a touch panel and a mouse, a keyboard, or a button. The operation unit 24 transmits an operation of the user to the control unit 21. The display unit 25 is, for example, a liquid crystal display unit or an organic EL display unit. The display unit 25 displays images according to an instruction from the control unit 21.

The programs and data described as being stored in the storage units 12 and 22 may be supplied via the network N. Further, the hardware configuration of each computer described above is not limited to the above example, and various types of hardware can be applied. For example, a reading unit (e.g., an optical disk drive or a memory card slot) for reading a computer-readable information storage medium or an input/output unit (e.g., a USB port) for inputting/outputting data to/from an external device may be included. For example, programs and data stored in the information storage medium may be supplied to through the reading unit or the input/output unit.

[2. Outline of Fraud Detection System]

In this embodiment, processing of the fraud detection system S will be described by taking an example of a case in which the server 10 provides a website related to a service such as news and video to a user, and a behavior of the user who uses the service by accessing the website is analyzed. For example, the server 10 stores a history of behaviors when the user accesses the website. The server 10 calculates a fraud level of a behavior for each user.

The fraud level is information indicating a degree of fraud. In other words, the fraud level is information indicating a degree of suspicion of fraud. In this embodiment, the case will be described in which the fraud level is represented by percentage, although the fraud level may be represented by other indexes. For example, the fraud level may be represented by a score, which is a numerical value other than percentage, or by characters such as S rank, A rank, and B rank. When the fraud level is represented by a numerical value, the higher the numerical value, the higher the fraud level. When the fraud level is represented by characters, each character defines the order of fraud levels.

Figure 2:
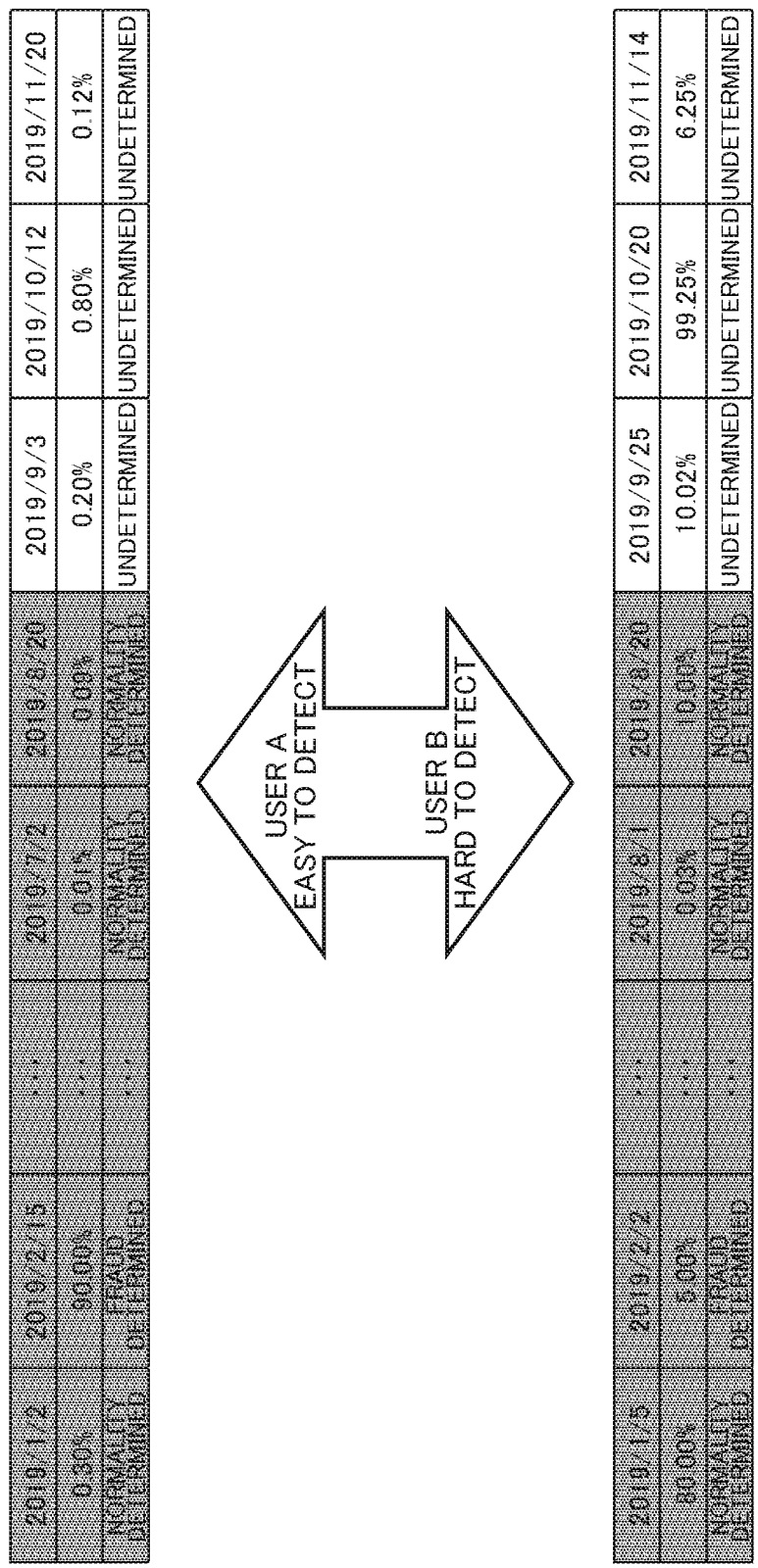
FIG. 2 is a diagram illustrating an outline of a calculating method of a fraud level.

FIG. 2 is a diagram illustrating an outline of a calculating method of the fraud level. In the example of FIG. 2, the current date is Nov. 30, 2019, and the dates when each of a user A and a user B used the service in 2019 are shown. In this embodiment, after the service is used and a predetermined determination timing arrives, whether the behavior at the time of using the service is actually fraudulent (fraudulent or normal) is determined.

In this embodiment, the determination timing is three months after the date of use, although the determination timing may be any timing. For example, the determination timing may be a predetermined date (e.g., 15th day of each month) or may be the time when an administrator of the service determines whether the fraud is detected. As another example, the determination timing may be the time when suspicion of unauthorized login (spoofing) by a third party is reported by a user.

In the example of FIG. 2, the behaviors up to the end of August 2019 have passed the determination timing, and thus whether the behaviors are fraudulent is already determined. In the following, a behavior for which whether it is fraudulent or not has been determined is described as a determined behavior, and a behavior for which whether it is fraudulent or not has not been determined is described as an undetermined behavior.

Each time the service is used, the server 10 uses a learning model to calculate a fraud level. For example, when receiving access by the user, the server 10 calculates a fraud level in real time based on the behavior during the session. The learning model is a model used in machine learning, and learns the relationship between the determined behavior (e.g., date and time of use, location of use, and frequency of use) and the determination result as to whether the behavior is fraudulent. For the machine learning itself, various known techniques, such as neural network, reinforcement learning, and deep learning, can be used. Machine learning is not limited to supervised machine learning, and semi-supervised machine learning or unsupervised machine learning may be used.

The server 10 inputs the behavior at the time of the service is used into the learning model, and acquires the fraud level output from the learning model. The learning model outputs the fraud level corresponding to the behavior entered in the learning model. The fraud level can also be referred to as the probability of fraud calculated by the learning model.

In the example of FIG. 2, the fraud level of 0.30% is calculated for the behavior of the user A performed on Jan. 2, 2019. This behavior is a determined behavior, and determined as being normal. Similarly, the server 10 uses the learning model to calculate a fraud level for each behavior on other days. When the determination timing of the behavior arrives, the determination result as to whether the behavior is fraudulent is stored in the server 10.

As shown in FIG. 2, the determined behavior of the user A is determined as not being fraudulent if the fraud level is low, and is determined as being fraudulent if the fraud level is high. For this reason, it can be said that the user A is a user for whom accuracy of the fraud detection by the learning model is high and fraud is easily detected (i.e., user easily captured by the learning model). For example, even if the user A makes a fraudulent behavior, there is a high possibility that the fraud level is calculated high and the fraud can be detected in real time.

On the other hand, the determined behaviors of the user B include the behavior that has a high fraud level but is determined as not being fraudulent and the behavior that has a low fraud level but is determined as being fraudulent. As such, it can be said that the user B is a user for whom fraud is difficult to be detected by the learning model (i.e., a user hardly captured by the learning model). For example, even if the user B makes a fraudulent behavior, there is a possibility that the fraud level is calculated low and the fraud cannot be detected in real time. Further, for example, even if the user B does not make a fraud behavior, the fraud level may be calculated high and the behavior may be determined as being fraudulent in error.

As such, the fraud detection system S of the present embodiment calculates accuracy of fraud detection for each user based on a fraud level output by the learning model and a determination result as to whether the behavior is actually fraudulent, and can specify whether the user is a user for whom fraud is easily detected. Details of this technique will be described below.

[3. Functions Implemented in Fraud Detection System]

Figure 3:
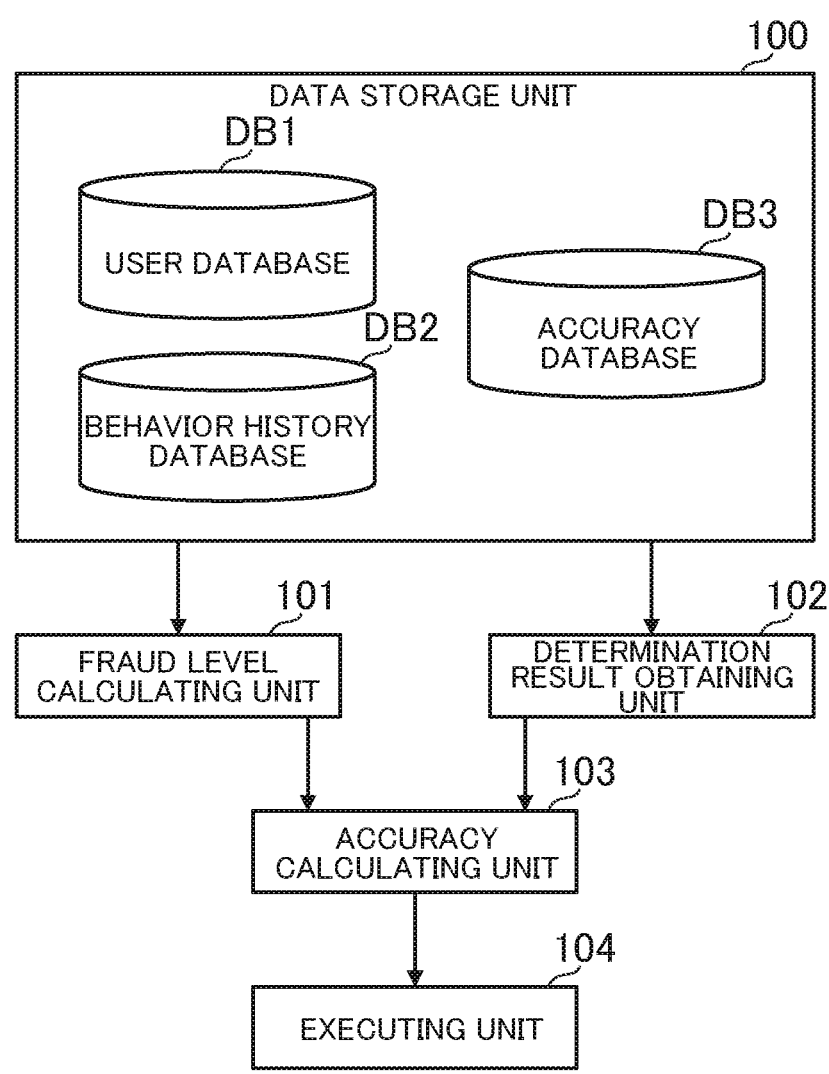
FIG. 3 is a functional block diagram showing an example of functions implemented in the fraud detection system.

FIG. 3 is a functional block diagram showing an example of functions implemented in the fraud detection system S. As shown in FIG. 3, a data storage unit 100, a fraud level calculating unit 101, a determination result obtaining unit 102, an accuracy calculating unit 103, and an executing unit 104 are implemented in the server 10.

[3-1. Data Storage Unit]

The data storage unit 100 is implemented mainly by the storage unit 12. The data storage unit 100 stores data required for calculating the accuracy of the fraud detection of the user. Here, as an example of the data stored in data storage unit 100, a user database DB1, a behavior history database DB2, and an accuracy database DB3 will be described.

FIG. 4 is a diagram illustrating an example of data storage of the user database DB1. As illustrated in FIG. 4, the user database DB1 is a database in which various types of information related to users is stored. For example, the user database DB1 stores a user ID, a user name, authentication information, center of use, an average access time, and an average access frequency. The user ID is information that uniquely identifies a user. The user name is a name of a user.

The authentication information is information to be a correct answer (index) at the time of authentication. The authentication may use various types of authentication, such as password authentication, certificate authentication, and biometric authentication. The authentication may be a single step or two or more steps. The user may specify which authentication to use.

The center of use is an average value of locations to use the service. The average access time is an average value of time to use the service. The average access frequency is an average value of frequency of using the service. These average values may be average values of all past periods, or average values of a part of the most recent periods. Furthermore, these averages may be simple averages or weighted averages. In the case of the weighted average, the weighting coefficient may be set to be higher as it is closer to the current point in time.

When the user registers the use of the service, the server 10 issues a user ID of the user based on a predetermined issuance rule. The server 10 generates a new record in the user database DB1 and stores the user name and the authentication information designated at the time of the use registration together with the issued user ID. The authentication information can be changed afterwards. The server 10 updates the center of use, the average access time, and the average access frequency when the user uses the service.

FIG. 5 is a diagram illustrating an example of data storage of the behavior history database DB2. As shown in FIG. 5, the behavior history database DB2 is a database in which the behavior history (usage status of the service) of the user is stored. For example, the behavior history database DB2 stores a behavior history ID, a user ID, an IP address, a URL, an access location, an access date and time, a fraud level, and a determination result.

In this embodiment, both the determined behavior and the undetermined behavior are stored in the behavior history database DB2, although only one of the determined behavior and the undetermined behavior may be stored in the behavior history database DB2. The behavior history database DB2 may store other information.

The behavior history ID is information that uniquely identifies a behavior. The IP address is an IP address of the user terminal 20 used for the service. The URL is a URL of a page accessed by the user. For example, a history of URLs is stored while a session between the server 10 and the user terminal 20 is established. The access location is a location of the user (user terminal 20) at the time when the service is used. The access location can be obtained by any method, and may be obtained by using, for example, an IP address, GPS information, access point information, or mobile base station information. The access date and time is date and time when the service is used.

Each time a session between the server 10 and the user terminal 20 is established, the server 10 issues a behavior history ID of the behavior based on the predetermined issuing rule. The server 10 generates a new record in the behavior history database DB2 and stores the behavior history ID, user ID, IP address, URL, access location, and access date and time. Assume that the user ID, the IP address, and the URL are included in an access request received by the server 10 from the user terminal 20. The access date and time is the date and time when the access request is received.

The fraud level is a degree of fraud of each behavior. The fraud level is stored in the fraud level calculating unit 101 described later. The determination result is a result indicating whether a behavior is fraudulent. The determination result is stored by the determination result obtaining unit 102 described later. As shown in FIG. 5, only the determination result of the determined behavior is stored, and the determination result of the undetermined behavior is not stored.

FIG. 6 is a diagram illustrating an example of data storage of the accuracy database DB3. As shown in FIG. 6, the accuracy database DB3 stores the accuracy of the fraud detection of users. For example, the accuracy database DB3 stores the user ID, accuracy of the fraud detection, and correction information.

The accuracy of the fraud detection is probability of detecting fraud by a fraud level. In other words, the accuracy of the fraud detection is a degree of coincidence or deviation between the fraud and the determination result. In this embodiment, the fraud level is calculated by the learning model, and thus the accuracy of the fraud detection can be referred to as reliability of the learning model or reliability of the fraud level. The accuracy of the fraud detection increases as the fraud level coincides with the determination result. The accuracy of the fraud detection decreases as the fraud level is different from the determination result. The accuracy of the fraud detection is stored by the accuracy calculating unit 103.

The correction amount is a degree of correction of a fraud level. For example, when the accuracy of the fraud detection is higher, the correction amount is smaller, and when the accuracy of the fraud detection is lower, the correction amount is greater. Further, for example, the correction amount may not be set if the accuracy of the fraud detection is equal to or greater than a threshold value, and the correction amount may be set if the accuracy of the fraud detection is less than the threshold value. The correction amount is stored by the executing unit 104 described later.

The data stored in the data storage unit 100 is not limited to the examples described above. For example, the data storage unit 100 stores programs (algorithms) and parameters of the learning model. Assume that the learning model has learned training data, and the parameters of the learning model have been adjusted. For example, a lot of pairs in which determined behaviors are input and determination results of fraud are output are stored in the training data. The input of these pairs is in the same data format as the behaviors entered into the learning model.

The behavior to be entered in the training data is information indicating the characteristics of the behavior, and is, for example, at least one of an IP address, a URL, an access location, an access date and time, and an access frequency. The behavior is stored in the behavior history database DB2. In this embodiment, the access location and the access date and time will be described as an example of the behavior. In the training data, information such as an access location may be stored as it is as the behavior, or a feature amount represented by a vector or an array may be stored.

The determination result to be an output of the training data is information indicating whether the behavior is fraudulent, and is, for example, a value of 100% indicating fraud or 0% indicating normal. The determination result does not have to be expressed by the binary values, and an intermediate value such as 30% may be used for the behavior that is not determined as being fraudulent by the administrator. The determination result may not be represented by a numerical value, but may be represented by a character indicating whether the behavior is fraudulent.

The training data may be stored in the data storage unit 100 or a computer or an information storage medium other than the server 10. For example, the training data is generated by an administrator. The server 10 performs learning processing of the learning model based on the training data. Various methods used in machine learning may be applied to the learning processing, for example, learning processing in a neural network may be used. The server 10 adjusts the parameters of the learning model so as to obtain the input-output relationship indicated by the training data.

[3-2. Fraud Level Calculating Unit]

The fraud level calculating unit 101 is mainly implemented by the control unit 11. The fraud level calculating unit 101 calculates a fraud level of a user who uses the service based on the behavior of the user. The fraud level calculating unit 101 calculates, for each user, a fraud level of the user based on the behavior of the user. The fraud level calculating unit 101 may calculate the fraud levels of all users, or may calculate the fraud levels of some users.

The behavior is information indicating how the service is used. The behavior can also be referred to as the content of use of the service or the demeanor at the time when the service is used. In this embodiment, the IP address, URL, access location, and access date and time stored in the behavior history database DB2 correspond to the behavior of the user, although only a part of them may correspond to the behavior, or other information entered in the server 10 when the service is used may correspond to the behavior.

In this embodiment, the fraud level calculating unit 101 calculates a fraud level of the behavior for which whether it is fraudulent has not been determined based on the learning model that has learned the behavior for which whether it is fraudulent has been determined as indicated by the determination result acquired by the determination result obtaining unit 102. The fraud level calculating unit 101 inputs information (e.g., an access location and an access date and time) indicating the behavior of the user to the learning model. The learning model calculates a feature amount of the entered information, and outputs a fraud level according to the feature amount. The fraud level calculating unit 101 acquires the fraud level output from the learning model. The feature amount may be calculated by an algorithm other than the learning model. In this case, the feature amount calculated by the algorithm is entered in the learning model.

For example, the fraud level calculating unit 101 calculates a fraud level of each behavior based on each of a plurality behaviors. Every time a behavior is executed, the fraud level calculating unit 101 calculates a fraud level based on the behavior.

For example, the fraud level calculating unit 101 calculates a fraud level so that the fraud level becomes higher as the IP address varies. Further, for example, the fraud level calculating unit 101 calculates a fraud level so that the fraud level becomes higher as the URL accessed by the user varies. Further, for example, the fraud level calculating unit 101 calculates a fraud level so that fraud level becomes higher as the access location is away from the center of use or the access location varies. Further, for example, the fraud level calculating unit 101 calculates a fraud level so that fraud level becomes higher as the access date and time deviates from the average access date and time or the access date and time varies. Further, for example, the fraud level calculating unit 101 calculates a fraud level so that fraud level becomes higher as the access frequency deviates from the average access frequency or the access frequency varies.

The fraud level may be calculated based on a predetermined method, and is not limited to the example using the learning model. For example, the fraud level calculating unit 101 may calculate a fraud level by digitizing the behavior of the user and substituting it into a predetermined calculation formula. Further, for example, the fraud level calculating unit 101 may calculate a fraud level based on a program code that defines the relationship between the behavior of the user and the fraud level.

[3-3. Determination Result Obtaining Unit]

The determination result obtaining unit 102 is mainly implemented by the control unit 11. The determination result obtaining unit 102 obtains a determination result of whether the behavior of the user is actually fraudulent. The determination result obtaining unit 102 obtains, for each user, a determination result of a behavior of the user. The determination result obtaining unit 102 may obtain the determination results of all the users or may obtain the determination results of some of the users.

The determination result is a first value indicating being fraud or a second value indicating being not fraud. For example, the determination result is specified by the administrator of the service. The administrator of the service does not need to specify the determination results for all of the behaviors, but may specify the determination results for only some of the behaviors.

For example, the determination result obtaining unit 102 obtains a temporary determination result based on a fraud level of each behavior, and presents the temporary determination result to the administrator. The temporary determination result is fraud if the fraud level is equal to or greater than a threshold value, and normal if the fraud level is equal to or greater than the threshold value. The administrator checks the temporary determination result and corrects an error if any. The administrator may check and correct the temporary determination result after a predetermined period of time has elapsed since the user uses the service, for example, three months from the date of use of the service. Further, if suspicion of fraud login is reported by the user, the administrator may correct the temporary determination result in which the fraud level is less than the threshold value. The determination result obtaining unit 102 obtains the determination result corrected by the administrator.

In this embodiment, a plurality of behaviors are performed, and thus the determination result obtaining unit obtains a determination result as to whether each behavior is actually fraudulent. The determination result obtaining unit obtains a determination result of each behavior. The determination result obtaining unit 102 may obtain the determination results of all of the behaviors or some of the behaviors.

[3-4. Accuracy Calculating Unit]

The accuracy calculating unit 103 is mainly implemented by the control unit 11. The accuracy calculating unit 103 calculates the accuracy of the fraud detection for each user based on the fraud level and the determination result. The accuracy calculating unit 103 calculates, for each user, accuracy of the fraud detection of a user based on a fraud level and a determination result of the user. The accuracy calculating unit 103 may calculate the accuracy of the fraud detection of all of the users, or may calculate the accuracy of the fraud detection of some of the users.

In this embodiment, a fraud level is calculated for each behavior, and thus the accuracy calculating unit 103 calculates the accuracy of the fraud detection based on a fraud level and a determination result of each behavior. For example, the accuracy calculating unit 103 substitutes a fraud level and a determination result of each behavior into a predetermined calculation formula, thereby calculating the accuracy of the fraud detection. This calculation formula may be any formula in which the accuracy of the fraud detection is calculated by substituting a fraud level and a determination result of each behavior.

The accuracy calculating unit 103 calculates the accuracy of the fraud detection so that the accuracy becomes higher as a fraud level is matched with a determination result. In this embodiment, "a fraud level is matched with a determination result" means that the determination result of the behavior having the fraud level equal to or greater than the threshold value is fraud. In other words, "a fraud level is matched with a determination result" means that the determination result of the behavior having the fraud level less than the threshold value is not fraud.

For example, the accuracy calculating unit 103 calculates a value of a predetermined loss function based on a fraud level and a determination result, and obtains the calculated value as the accuracy. The loss function is a function for calculating an error between a fraud level and a determination result. Various functions can be used for the loss function, for example, a function to evaluate the accuracy of a learning model such as a neural network (so-called Loss or LogLoss) can be used. In the loss function, the larger the error between the fraud level and the determination result is, the lower the accuracy obtained as the calculation result becomes, and the smaller the error is, the higher the accuracy obtained as the calculation result becomes.

The accuracy of the fraud detection may be calculated based on a predetermined method, and is not limited to the example using the calculation formula such as the loss function. For example, the accuracy calculating unit 103 may calculate the accuracy of the fraud detection using the learning model that has learned the relationship between the fraud level and the determination result and the accuracy of the fraud detection. Further, for example, the accuracy calculating unit 103 may calculate the accuracy of the fraud detection based on the program code defining the relationship between the fraud level and the determination result and the accuracy of the fraud detection.

[3-5. Executing Unit]

The executing unit 104 is mainly implemented by the control unit 11. The executing unit 104 executes processing according to the accuracy of the fraud detection. The executing unit 104 executes, for each user, processing according to the accuracy of the fraud detection of a user. The executing unit 104 may execute processing for all the users or only for some of the users.

The processing according to the accuracy of the fraud detection is processing that is determined to be executed or not depending on the accuracy of the fraud detection, or processing that is changed in content depending on the accuracy of the fraud detection. In this embodiment, as an example of such processing, processing of changing a value of the fraud level calculated by the fraud level calculating unit 101 will be described, although such processing may be any processing. For example, the processing may be providing a coupon as in a variation described later. For example, the processing may be restricting the use of the service, requesting additional authentication, or providing a reward other than a coupon.

For example, the executing unit 104 determines a correction amount of the fraud level based on the accuracy of the fraud detection of the user. The executing unit 104 determines a correction amount so that the correction amount is increased as the accuracy of the fraud detection is lower. The executing unit 104 determines a correction amount so that the correction amount is decreased as the accuracy of the fraud detection is higher. For example, the executing unit 104 may set a correction amount for a user for whom the accuracy of the fraud detection is less than the threshold value, and may not set a correction amount for a user for whom the accuracy of the fraud detection is greater than or equal to the threshold value. The executing unit 104 changes the value of the fraud level calculated by the fraud level calculating unit 101 based on the correction amount determined as described above.

[4. Processing Executed in the Embodiment]

Next, the processing executed in the fraud detection system S will be described. Here, service use processing for a user to use a service and accuracy calculation processing for calculating accuracy of fraud detection of the user will be described.

[4-1. Service Use Processing]

Figure 7:
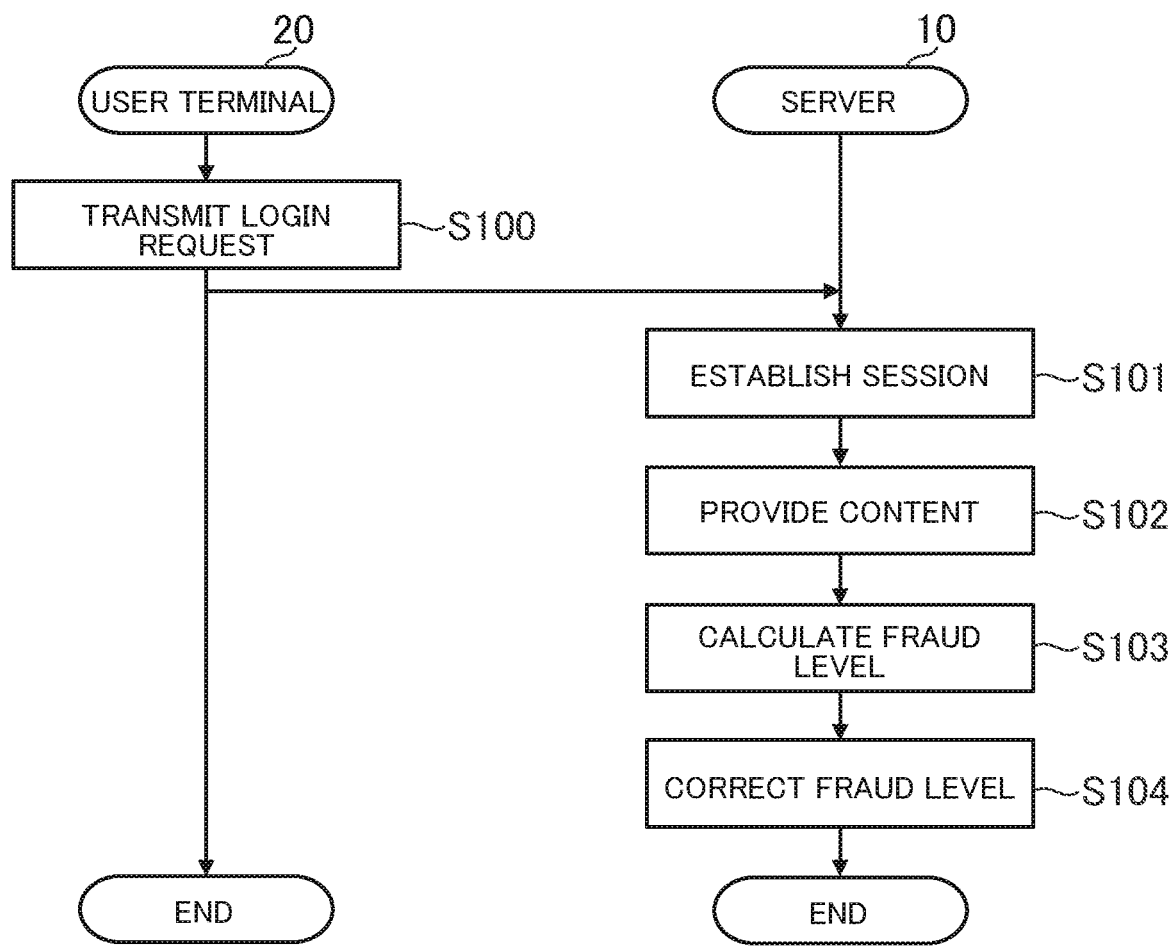
FIG. 7 is a flow chart illustrating an example of service use processing.

FIG. 7 is a flow chart illustrating an example of the service use processing. The service use processing shown in FIG. 7 is executed when the control units 11 and 21 operate in accordance with the programs stored in the storage units 12 and 22, respectively. The processing described below is an example of the processing executed by the functional blocks shown in FIG. 3. When the service use processing is executed, assume that the user has completed the use registration.

As shown in FIG. 7, the user terminal 20 transmits a login request for logging in to the service to the server 10 (S100). The login request may be performed by transmitting data in a predetermined format, for example, data including a user ID and authentication information. The authentication information may be stored in the storage unit 22 of the user terminal 20, or may be entered from the operation unit 24. As another example, in a case where biometric authentication is used, the authentication information may be entered from a camera of the user terminal 20.

Upon receiving the login request, the server 10 establishes a session with the user terminal 20 (S101). In S101, the server 10 performs the user authentication based on the user ID and the authentication information included in the login request. If the user authentication is successful, the server 10 establishes a session. If the user authentication is not successful, the session is not established and the processing terminates.

The server 10 provides content such as news and articles in response to the user's access request (S102). The access request includes an IP address of the user terminal 20 and a URL to the content to be accessed. The server 10 provides the user with the content corresponding to the URL. The server 10 issues a behavior history ID and stores the user ID, IP address, URL, access location, and access date and time in the behavior history database DB2. Subsequently, the processing of S102 is repeated until the session is disconnected. Each time content is provided, the URL, access location, and access date and time of the issued behavior history ID are added.

When the session with the user terminal 20 is disconnected, based on the behavior of the user during that time and the learning model stored in storage unit 12, the server 10 calculates a fraud level corresponding to such behavior (S103). In S103, the server 10 enters the IP address, URL, access location, and access date and time during the session in the learning model, and obtains the fraud level output by the learning model.

The server 10 corrects the fraud level calculated in S103 based on the accuracy database DB3 (S104), and the processing terminates. In S104, the server 10 refers to the accuracy database DB3 to obtain the correction amount corresponding to the user. The server 10 corrects the fraud level calculated in S103 based on the obtained correction amount, and stores the fraud level in the behavior history database DB2. For a user for whom the correction is not required, the processing of S104 is not executed, and the server 10 stores the fraud level calculated in S103 in the behavior history database DB2. The server 10 may execute the processing of S104 before the session is disconnected, and may stop providing the content if the corrected fraud level is very high.

[4-2. Accuracy Calculation Processing]

Figure 8:
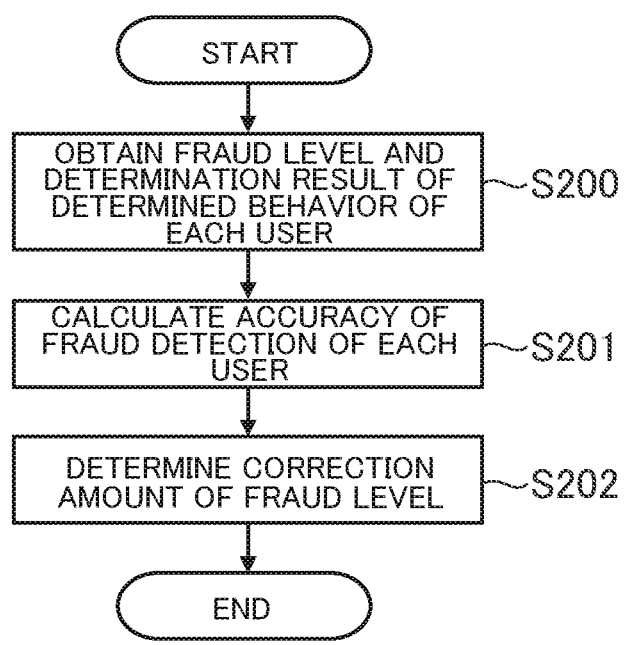
FIG. 8 is a flow chart showing an example of accuracy calculation processing.

FIG. 8 is a flow chart showing an example of the accuracy calculation processing. The accuracy calculation processing shown in FIG. 8 is executed when the control unit 11 operates in accordance with programs stored in the storage unit 12. The processing described below is an example of the processing executed by the functional blocks shown in FIG. 3. The accuracy calculation processing may be executed at any timing, for example, when the administrator performs a predetermined operation, or when a predetermined date and time (e.g., three months after the date of use of the service) arrives.

As shown in FIG. 8, first, the server 10 obtains a fraud level and a determination result of a determined behavior of each user based on the behavior history database DB2 (S200). In S200, the server 10 refers to the behavior history database DB2 and obtains, for each user, a pair of a fraud level and a determination result of a determined behavior (behavior over three months ago).

The server 10 calculates accuracy of fraud detection of a user based on a fraud level and a determination result of the determined behavior of the user (S201). In S201, for each user, the server 10 substitutes a fraud level and a determination result into the loss function and calculates the accuracy of the fraud detection. The server 10 stores the accuracy of the fraud detection of each user in the accuracy database DB3.

The server 10 determines a correction amount of a fraud level based on the accuracy of the fraud detection of each user (S202), and the processing terminates. In S202, the server 10 determines, for each user, a correction amount corresponding to the accuracy of the fraud detection of the user. The server 10 stores a correction amount determined for each user in the accuracy database DB3. The correction amount stored in the accuracy database DB3 becomes effective the next time the user logs in, and is referenced in the subsequent service use processing.

According to the fraud detection system S of the present embodiment, the accuracy of the fraud detection for each user can be calculated based on a fraud level corresponding to a behavior of the user and a determination result as to whether the behavior is actually fraudulent. By calculating the accuracy of the fraud detection for each user, a calculation method of a fraud level can be evaluated for each user. This serves to identify whether a user can be captured by the current calculation method and to improve the security in the fraud detection system S. Further, a user who is easily captured by the current calculation method can be stopped by the fraud detection system S, and thus the administrator does not need to pay attention to such a user, and the burden on the administrator can be reduced. Further, by calculating the accuracy of the fraud detection for each user, it is possible to specify whether the number of users who are hardly captured has increased. This also serves to update the learning model using the training data prepared to meet the latest trends, for example, when the number of the users who are hardly captured has increased. This allows the accuracy of the learning models to be improved, and also the security in the fraud detection system S to be improved.

The fraud detection system S calculates the accuracy of the fraud detection for each user based on a fraud level and a determination result of each of a plurality of behaviors, thereby calculating the accuracy of the fraud detection in which the plurality of behaviors are comprehensively considered, and improving the accuracy of calculation. This allows the security of the fraud detection system S to be effectively improved.

The fraud detection system S calculates a fraud level of a behavior for which whether it is fraudulent has not been determined based on the learned model that has learned the behavior for which whether it is fraudulent has been determined, thereby improving the accuracy of calculation of the fraud level. For example, by causing the learning model to learn new training data, it is possible to calculate a fraud level with high accuracy corresponding to the latest trend of fraud. By increasing the accuracy of calculating a fraud level, the security in the fraud detection system S can be effectively improved.

The fraud detection system S calculates a value of the predetermined loss function based on a fraud level and a determination result and acquires the calculated value as the accuracy of the fraud detection, thereby effectively improving the accuracy of calculation of the fraud level. This allows the security of the fraud detection system S to be effectively improved. For example, if it is expected that the majority of users are not fraudulent, the fraud detection system S may use clustering to extract a certain number of users having similar trends of use based on the behavior history database DB2 and calculate the accuracy of the fraud detection of the learning model among them. In this case, the accuracy of the fraud detection can be determined to some extent for a user who has not been fraudulent or a user whose usage history is short.

The fraud detection system S executes the processing according to the accuracy of the fraud detection, thereby providing a service according to the accuracy of the fraud detection, or restricting use of the service according to the accuracy of the fraud detection, for example.

The fraud detection system S can effectively improve the accuracy of calculation of a fraud level by executing the processing of changing a value of the fraud level as the processing corresponding to the accuracy of the fraud detection. This enables to capture a user who is hardly to be captured by the fraud detection system S to some extent, and to effectively improve the security in the fraud detection system S.

[5. Variations] The one or more embodiments of the present invention is not to be limited to the above described embodiment. The one or more embodiments of the present invention can be changed as appropriate without departing from the spirit of the one or more embodiments of the invention.

(1) For example, a learning model is not reliable if in many times the fraud level is calculated low even if the behavior is fraudulent (so-called false negative) or the fraud level is calculated high even if the behavior is normal (so-called false positive). In particular, in order to evaluate the loss of the false negative to be particularly significant, the loss function may have coefficients that are defined such that the false negative has a large impact on the accuracy.

The loss function in this variation is so-called weighted LogLoss. This loss function has the property of exponentially increasing in value when the learning model erroneously determines the right or wrong (when false negative or false positive occurs). The loss function allows the importance of false negatives and false positives to be adjusted by the coefficient defined by the administrator. For example, if the coefficient is a predetermined value, the loss function is normal LogLoss but can be adjusted to more emphasize the false negative by reducing the coefficient.

According to the variation (1), the coefficient of the loss function used in the calculation of the accuracy of the fraud detection is determined so that the impact of the false negative on the accuracy is emphasized. This can prevent the most untrustworthy case in which the fraud level is calculated low despite the fact that the behavior is fraudulent, and effectively improve the security in the fraud detection system S.

(2) For example, the determination result obtaining unit 102 may obtain the determination result of a behavior of another user, and the fraud level calculating unit 101 may calculate a fraud level on the assumption that another user's behavior, for which whether it is fraudulent has been determined, is performed by the user. Another user is a user other than the user for whom a fraud level is to be calculated, and may be a user having a behavior characteristic similar to that of the user for whom a fraud level is to be calculated, for example.

Figure 9:
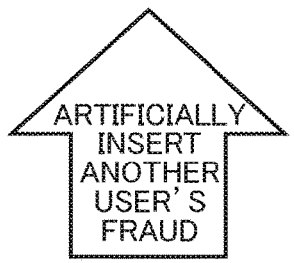
FIG. 9 is a diagram illustrating a calculation method of a fraud level in variation (2)

FIG. 9 is a diagram illustrating a calculation method of a fraud level in variation (2). In the example of FIG. 9, the behaviors of another user performed on Feb. 21, 2019 and Feb. 26, 2019 are determined as being fraudulent. The fraud level calculating unit 101 calculates a fraud level on the assumption that these behaviors have been performed by the user for whom a fraud level is to be calculated. The method of calculating the fraud level is the same as that described in the embodiment, and different from the method of the embodiment only in that the fraud level is calculated by artificially generating a behavior that does not originally occur.

The accuracy calculating unit 103 calculates the accuracy of the fraud detection based on the fraud level of the behavior assumed to have been performed by the user and the determination result of the behavior of another user. For example, the accuracy calculating unit 103 calculates the accuracy of the fraud detection so that the accuracy becomes higher as the fraud level of the behavior assumed to have been performed by the user matches the determination result of the behavior of another user.

In the example of FIG. 9, the accuracy calculating unit 103 is able to determine that the fraudulent behavior is fraudulent when the fraud level of the behavior of another user, which has been artificially generated, is equal to or greater than a threshold value, and thus calculates the accuracy of the fraud detection so that the accuracy of the fraud detection is increased. On the other hand, the accuracy calculating unit 103 is not able to determine that the fraudulent behavior is fraudulent when the fraud level of the behavior of another user, which has been artificially generated, is less than the threshold value, and thus calculates the accuracy of the fraud detection so that the accuracy of the fraud detection is reduced.

According to the variation (2), the accuracy of the calculation can be increased by assuming that the behavior of another user for whom the determination result is obtained is performed by the user and calculating the fraud level. This can also increase the accuracy of the fraud detection. For example, by generating an artificial situation, it is possible to evaluate the accuracy of the fraud detection for a user whose usage history is short or a user who has not been affected by fraud.

(3) For example, the fraud level calculating unit 101 may determine a weighting coefficient in calculation of a fraud level based on a fraud level according to a behavior performed in the past and a determination result of whether the behavior is actually fraudulent, and calculate the fraud level based on the determined weighting coefficient. The weighting coefficient is a coefficient to be used to calculate a fraud level. The weighting coefficient is used to correct a temporary fraud level. The temporary fraud level is a fraud level calculated in the manner described in the embodiment. For example, the fraud level calculating unit 101 determines an appropriate weighting coefficient from the distribution of the fraud levels and determination results thereof calculated in the past, and calculates a fraud level based on the determined weighting coefficient.

Figure 10:
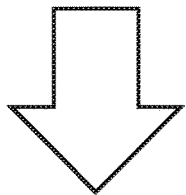
FIG. 10 is a diagram showing an outline of variation (3).

FIG. 10 is a diagram showing an outline of the variation (3). Similarly to FIG. 2, the current point of time in FIG. 10 is Nov. 30, 2019. FIG. 10 shows the fraud levels of the determined behaviors of the user A in 2019 and the determination results of whether the behaviors are fraudulent.

As shown in FIG. 10, the server 10 extracts a plurality of data sets based on the behaviors of the user A. The behaviors contained in the data sets differ from one another. For example, the server 10 extracts a data set by randomly dividing periods. As another example, the server 10 may search for the behavior that is determined as being fraudulent, and if the behavior that is determined as being fraudulent is found, the server 10 may extract the behaviors up to that point as a data set.

For example, assuming that the weighting function of the calculation formula of the fraud level depends only on the elapse of time, the deviation (so-called Loss) between the fraud level output by the learning model and the determination result as to whether the behavior is actually fraudulent can be set according to the weighting function. The server 10 estimates a weighting function that minimizes the deviation for the entire data. For example, such estimation may be analytically solved by the definition of the loss function and the weighting function, or approximately solved by an optimization solver. An exponential function, a logistic curve, or a linear function can be defined as the weighting function.

For example, the fraud level calculating unit 101 corrects the temporary fraud level output from the learning model so that the deviation between the fraud level output from the learning model and the determination result as to whether the behavior is actually fraudulent becomes small. The correction amount is determined by the weighting coefficient in the weighting function. The deviation may vary from user to user, and thus the fraud level calculating unit 101 corrects the temporary fraud level so that the correction amount of the temporary fraud level increases as the deviation increases. For example, in the case where the deviation calculated from the determined behavior in the past is high for each user, the fraud level calculating unit 101 corrects the temporary fraud level calculated by the learning model to be low.

According to the variation (3), the fraud level is calculated further based on the behavior in the past and the determination result whether the behavior is actually fraudulent. This increases the accuracy of the calculation of the fraud level. By increasing the accuracy of the calculation of the fraud level, the accuracy of the fraud detection can also be increased.

(4) For example, the fraud level calculating unit 101 may calculate the fraud level further based on at least one of the authentication method of the user and the nominee of the user. For example, the fraud level calculating unit 101 calculates the fraud level so that the higher the strength of the authentication method specified by the user, the lower the fraud level. The strength of the authentication method may be determined by the strength of a password, whether two-stage authentication is registered, or the type of biometric authentication.

Further, for example, the fraud level calculating unit 101 calculates the fraud level so that the higher the difference between the holder of the credit card registered by the user and the name registered by the user in the user database DB1, the higher the fraud level. It is also possible to calculate the accuracy of the fraud detection by generating a learning model in which the relationship between the holder or the name and the fraud level as described above is learned and calculating the fraud level based on the learning model. Further, without using a learning model, the fraud level may be calculated based on the difference in the number of characters between the credit card holder's character string and the user's name character string.

According to the variation (4), the accuracy of calculation of the fraud level can be improved by calculating the fraud level further based on at least one of the authentication method of the user and the nominee of the user. As the accuracy of calculation of the fraud level is increased, the accuracy of calculation of the fraud detection can also be increased.

(5) For example, the processing executed by the executing unit 104 is not limited to the example described in the embodiment. For example, the processing corresponding to the accuracy of the fraud detection may be processing for providing a coupon relating to the service to the user. The coupon may be any coupon relating to the service, for example, a right to receive a discount when using the service, a right to receive a point when using the service, or a right to receive content or an item when using the service.

For example, the executing unit 104 does not provide a coupon to a user for whom the accuracy of the fraud detection is less than the threshold value, and provides a coupon to a user for whom the accuracy of the fraud detection is greater than or equal to the threshold value. The threshold value may be a fixed value, or a variable value. The threshold value may be determined for each user. For example, in the case where a plurality of types of coupons are prepared, the executing unit 104 provides a coupon according to the accuracy of the fraud detection for the user. The executing unit 104 provides a coupon having a higher value as the accuracy of the fraud detection for the user is higher. In this case, the coupons are ranked according to the accuracy of the fraud detection.

According to the variation (5), as the processing in accordance with the accuracy of the fraud detection, preferential treatment can be provided based on the accuracy of the fraud detection by providing coupons. For example, even if a coupon is provided to a user for whom the fraud level is liable to be calculated high, the fraud detection system S is highly likely to capture the fraud of the user, and thus it is possible to reduce a decrease in opportunities for using the service by providing the coupon.

(6) Further, for example, the above variations may be combined.

Further, for example, in the embodiment, the case has been described in which whether the behavior is fraudulent is determined when a predetermined period has elapsed since the user uses the service, although a behavior may be checked by the administrator immediately after the user uses the service so as to determine whether the behavior is fraudulent. For example, the case has been described in which the fraud detection system S executes the processing corresponding to the accuracy of the fraud detection, although this processing may not be executed but the administrator may analyze the accuracy of the fraud detection, or the processing may be executed by external systems. That is, the fraud detection system S may not include the executing unit 104.

For example, the case has been described in which the service for providing content is taken as an example of a service, although the fraud detection system S may be applied to a scene of fraud detection in any service such as a payment service, an e-commerce service, a travel reservation service, a financial service, an insurance service, and a communication service. For example, in a case where the fraud detection system S is applied to the payment service, the user's behavior is an individual payment. Each payment is sometimes called a transaction. The learning model calculates a fraud level based on the amount and the date and time of the payment, for example. The accuracy of the fraud detection is the probability of capturing a fraud at the time of the payment.

Various types of payment can be used for the payment. For example, the payment may be credit card payment, electronic money payment, virtual currency payment, wallet payment, point payment, debit card payment, or account transfer payment. Further, various methods can be used for the method of implementing the payment. For example, the payment may be performed by using an IC chip included in the user terminal 20, or using a one-dimensional or two-dimensional code displayed on the user terminal 20 or a terminal of a store. The user may use the service without operating the user terminal 20. For example, the user may use the service by causing the terminal of the actual store to read a medium such as a credit card or an IC card. Further, for example, the user may use the service by using biometric authentication without using such media. Further, the administrator of the service may not be a credit card company or may be a credit card company.

Further, for example, the case in which the main functions are implemented in the server 10 has been described, although a plurality of computers may share the functions. For example, the server 10 and the user terminal 20 may share the functions. Further, for example, in a case where the fraud detection system S includes a plurality of server computers, the server computers may share the functions. For example, the data described as being stored in the data storage unit 100 may be stored by a computer other than the server 10.

The invention claimed is:

1. A fraud detection system comprising at least one processor configured to:
    calculate a fraud level of a user who uses a service based on a behavior of the user obtained during a networked-session on the service;
    obtain a determination result as to whether the behavior is actually fraudulent;
    calculate accuracy of fraud detection for each user based on the fraud level and the determination result;
    calculate a fraud level of each behavior based on each of a plurality of behaviors,
    obtain a determination result as to whether each behavior is actually fraudulent,
    calculate the accuracy based on a fraud level and a determination result of each behavior; and
    store the accuracy associated with the user.

2. The fraud detection system according to claim 1, wherein
    the at least one processor calculates the fraud level of a behavior for which whether it is fraudulent has not been determined based on a learning model that has learned a behavior for which whether it is fraudulent has been determined as indicated by the determination result.

3. The fraud detection system according to claim 1, wherein
    the at least one processor calculates a value of a predetermined loss function based on the fraud level and the determination result, and obtains the calculated value as the accuracy.

4. The fraud detection system according to claim 3, wherein
    a coefficient of the loss function is determined such that a false negative has a greater impact on the accuracy as compared to a false positive.

5. The fraud detection system according to claim 1, wherein
    the at least one processor calculates the fraud level on an assumption that a behavior of another user for which whether it is fraudulent has been determined is performed by the user,
    the at least one processor obtains the determination result of the behavior of the another user, and
    the accuracy is calculated based on the fraud level of the behavior that is assumed to be performed by the user and the determination result of the behavior of the another user.

6. The fraud detection system according to claim 1, wherein
    the at least one processor determines a weighting coefficient in calculating the fraud level based on the fraud level according to a behavior that is previously performed and a determination result as to whether the behavior is actually fraudulent, and calculates the fraud level based on the determined weighting coefficient.

7. The fraud detection system of claim 1, wherein
    the at least one processor calculates the fraud level further based on at least one of an authentication method of the user and a holder of a credit card of the user.

8. The fraud detection system according to claim 1, wherein the at least one processor executes processing according to the accuracy.

9. The fraud detection system according to claim 8, wherein
    the processing is processing for changing a value of the calculated fraud level.

10. The fraud detection system according to claim 8, wherein
    the processing is processing for providing the user with a coupon relating to the service.

11. A fraud detection method comprising:
    calculating a fraud level of a user who uses a service based on a behavior of the user obtained during a networked-session on the service;
    obtaining a determination result as to whether the behavior is actually fraudulent;
    calculating accuracy of fraud detection for each user based on the fraud level and the determination result;

calculating a fraud level of each behavior based on each of a plurality of behaviors, obtaining a determination result as to whether each behavior is actually fraudulent, calculating the accuracy based on a fraud level and a determination result of each behavior; and storing the accuracy associated with the user.

12. A non-transitory computer-readable information storage medium for storing a program for causing a computer to:

calculate a fraud level of a user who uses a service based on a behavior of the user obtained during a networked-session on the service;

obtain a determination result as to whether the behavior is actually fraudulent;

calculate accuracy of fraud detection for each user based on the fraud level and the determination result;

calculate a fraud level of each behavior based on each of a plurality of behaviors, obtain a determination result as to whether each behavior is actually fraudulent, calculate the accuracy based on a fraud level and a determination result of each behavior; and store the accuracy associated with the user.

* * * * *